United States Patent [19]

Knight

[11] Patent Number: 5,084,179

[45] Date of Patent: Jan. 28, 1992

[54] NARROW PORE-SIZE DISTRIBUTION POLYTETRAMETHYLENE ADIPAMIDE OR NYLON 46 MEMBRANES AND PROCESS FOR MAKING THEM

[75] Inventor: Rodney A. Knight, Southington, Conn.

[73] Assignee: Cuno, Incorporated, Meriden, Conn.

[21] Appl. No.: 545,476

[22] Filed: Jun. 28, 1990

[51] Int. Cl.$^5$ .............................. B01D 71/56
[52] U.S. Cl. ..................... 210/500.38; 55/158
[58] Field of Search ............... 210/500.38; 55/16, 158

[56] References Cited

U.S. PATENT DOCUMENTS

| | | | |
|---|---|---|---|
| 4,340,479 | 7/1982 | Pall et al. | 210/490 |
| 4,340,480 | 7/1982 | Pall et al. | 210/490 |
| 4,617,235 | 10/1986 | Shinonome et al. | 428/374 |
| 4,774,038 | 9/1988 | Ditier et al. | 55/16 |
| 4,788,226 | 11/1988 | Curry | 210/500.38 |
| 4,814,356 | 3/1989 | Bongers et al. | 521/56 |

FOREIGN PATENT DOCUMENTS

WO90/06806  6/1990  PCT Int'l Appl. .

*Primary Examiner*—Frank Sever
*Attorney, Agent, or Firm*—Willian Brinks Olds Hofer Gilson & Lione

[57] ABSTRACT

A hydrophilic polytetramethylene adipamide microporous membrane has a narrow pore-size distribution. The membrane is formed by a rapid quench process in a quench bath having solubility parameter above and 21 Hildebrands.

7 Claims, 2 Drawing Sheets

NARROW PORE-SIZE DISTRIBUTION POLYTETRAMETHYLENE ADIPAMIDE OR NYLON 46 MEMBRANES AND PROCESS FOR MAKING THEM

BACKGROUND OF THE INVENTION

This invention relates to microporous membranes and processes for making such membranes. In particular, it relates to polytetramethylene adipamide or nylon 46 microporous membranes having narrow pore-size distributions. Such membranes are, therefore, useful, for example, for efficient filtration of particulates from liquids, and especially from aqueous liquids. They are also useful as transfer media.

A microporous membrane is a porous solid which contains microporous interconnecting passages that extend from one surface to the other. These passages provide tortuous tunnels through which the liquid which is being filtered must pass. The particles contained in the liquid passing through a microporous membrane become trapped on or in the membrane structure effecting filtration. A slight pressure, generally in the range of about 5 to 50 psig (pounds per square inch gauge) is used to force fluid through the microporous membrane. The particles in the liquid that are larger than the pores are either prevented from entering the membrane or are trapped within the membrane pores. The liquid and particles smaller than the pores of the membrane pass through. Thus, a microporous membrane prevents particles of a certain size from passing through it, while at the same time permitting liquid and particles smaller than that size to pass through. The microporous filter membranes have the ability to retain particles in the size range from about 0.1 to about 10.0 microns.

Many important micron and submicron size particles can be separated using microporous membranes. For example, red blood cells are 8 microns in diameter, platelets are about 2 microns and bacteria and yeasts may be 0.5 microns or smaller. It is possible to remove bacteria from water by passing the water through a microporous membrane having a pore size smaller than the bacteria. Similarly, a microporous membrane can remove invisible suspended particles from water used in the manufacture of integrated circuits in the electronics industry. Microporous membranes are characterized by bubble point tests, which involve measuring the pressure to force either the first air bubble out of the membrane (initial bubble point) or force air bubbles out all over the membrane (foam-all-over-point or "FAOP"). The procedures for conducting initial bubble point and FAOP tests are well known in the art. The procedures poor these tests are explained in detail for example in ASTM F316-70 and ANS/ASTM F316-70 (Reapproved 1976) which are incorporated herein by reference. The bubble point values for microporous membranes are generally in the range of about 5 to about 100 psig, depending on the pore size.

Microporous membranes are distinguishable from semipermeable membranes which include ultrafiltration (U.F.) and reverse osmosis (R.O.) membranes. Ultrafiltration membranes are used for molecular separation rather than particle filtration, i.e., they are used to separate out large molecules, including proteins and dye molecules in the size range of 0.001 micron (10 Angstroms) to 0.1 micron (1000 Angstroms). Unlike ultrafiltration and microporous membranes, the reverse osmosis (R.O.) membranes do not act as sieves. Instead of retaining larger molecules, the reverse osmosis (R.O.) membranes allow certain selected molecules to pass through them. The passage of these molecules is determined by the chemical affinity of the molecules toward the membrane material. The molecule which passes through the membrane may or may not be smaller than those retained.

Strictly speaking, the reverse osmosis membranes are not filtration membranes. However, the terms "molecular filtration" or "hyperfiltration" are sometimes used to describe the operation of these membranes.

The semipermeable membranes, i.e., ultrafiltration and reverse osmosis membranes, possess a thin non-porous outer layer that is usually supported on a much thicker support layer. The outer layer is sometimes referred to as a "skin." The "skin" of a semipermeable membrane is non-porous in the micron range; however, it does contain molecular size openings which are measured in Angstroms. One Angstrom is one ten thousandth (1/10,000) of a micron. The separation in semipermeable membranes is controlled by the skin and the skin must be thin to reduce the overall resistance to flow. To maintain the integrity of the reverse osmosis (R.O.) membrane, a much thicker porous layer is present. Semi-permeable membranes separate molecules. Accordingly, to achieve separation using semipermeable membranes, significantly higher pressures than those for microporous membranes are required. For example, the semipermeable R.O. membranes of U.S. Pat. No. 3,703,570 (Busch) required about 600 psig pressure to achieve 50% salt rejection. Likewise, pressure of about 600 psig was required to achieve 95% separation of a salt from a salt solution using the semipermeable membranes disclosed in U.S. Pat. No. 3,699,038 (Boom). The bubble point tests are not applicable or used for the characterization of semipermeable membranes. Instead, such membranes are characterized by measurement of salt or other solute rejection.

Similarly, microporous membranes should be distinguished from artificial leather materials, such as those described in the Japanese patent application 26749-1969 (Teijin), U.S. Pat. No. 3,208,875 (Holden) U.S. Pat. No. 3,000,757 (Johnston) and U.S. Pat. No. 3,190,765 (Yuan). The Japanese patent application of Teijin discloses a process for making a leather substitute that is composed of unconnected cells similar to those present in urethane foam. When reproduced, Examples 3 and 4 of the Teijun Japanese patent application, produced foam-like nylon materials. The leather materials of Examples 3 and 4, made of nylon that is alcohol insoluble at room temperature, had skins on both surfaces of the sheet.

Similarly, the water vapor permeable sheet materials of the U.S. Pat. No. 3,208,875 (Holden), U.S. Pat. No. 3,190,765 (Yuan) and U.S. Pat. No. 3,000,757 (Johnston) patents are examples of other patents disclosing polymeric sheet materials useful as leather substitute materials. Like Teijin materials, these sheets do not contain micropores formed of interconnected passages providing tortuous tunnels from one side of the material to the other, characteristic of microporous membranes. In addition, these leathersubstitute materials contain thin non-porous skins on one or both of their surfaces. Because of these skins and the essentially unconnected cells, the artificial leather materials do not permit the flow of liquid through them. Instead, they allow vapors to diffuse through the material between the cells and through the skin. Accordingly, the artificial leather materials are generally characterized by a leather permeability value (LPV), 5000 grams per hour per 100 square meters determined by the test described by Kanagy and Vickers in the *Journal of the American Leather Chemists Association* 45, 211-242 (Apr. 19, 1950).

The original method for making nylon microporous membranes for filtration was a slow and inefficient vapor equilibration process, sometimes referred to as "the dry" process. A dry process for making alcohol-soluble nylon membranes is described in U.S. Pat. No. 3,408,315 (Paine). In that process, the liquid components of the polymeric solution are selected based on different relative volatilities. A solution is prepared from a polymer, a more volatile (easily evaporated) solvent and a less volatile (less easily evaporated) component. The process is based on the principle that the more volatile component evaporates faster causing a gradual change of concentration eventually leading to precipitation of the polymer.

The polymer solution is spread onto a surface, and then subjected to a slow and cumbersome controlled multi-stage evaporation in vapor equilibration chambers. Each successive stage contains slightly less concentrated vapor of the volatile component of the solution, allowing increasingly more solvent to evaporate from the spread nylon solution until an equilibrium is reached in that stage. The more volatile solvent is gradually removed by evaporation until the polymer concentration in the solvent becomes high enough for the polymer to precipitate forming a microporous structure. In order to obtain a membrane with micropores throughout, i.e., without a thin skin, the evaporation of the solvent has to be carried out at each stage near equilibrium conditions. Otherwise, the solvent would evaporate preferentially from the surface causing a high local concentration of the polymer and locally precipitating the polymer there. The remainder of the membrane would not be formed till later. A rapid evaporation thus causes a thin semipermeable or an entirely solid skin. Accordingly, the rate of the dry process is limited by the need to slowly evaporate the more volatile component in order to maintain vapor equilibrium. After the membrane is formed in the equilibrium chambers, the solvents are washed off and the resulting microporous membrane is dried. Millipore Company manufactured and sold alcohol-soluble hydrophilic microporous nylon membranes under the trademark DURALON from about 1964 to about 1975.

U.S. Pat. No. 3,876,738 (Marinaccio-Knight) discloses the first rapid and efficient process to make a nylon microporous membrane. A nylon dope solution is prepared and immersed into a quench bath containing a non-solvent system, without the slow and cumbersome equilibration step of the dry process. Marinaccio and Knight were first to discover that direct immersion (the "wet process") could be used to make nylon microporous membranes catastrophically, preferably from alcohol-insoluble nylon such as, nylon 6, 66 or 610, using formic acid as the solvent.

The Marinaccio-Knight patent discloses that by altering the characteristics of the nylon solvent in a particular way the formation of a thin skin or a cellular structure can be avoided. A membrane with micropores throughout could thereby be formed catastrophically, as long as the modified nylon solution is solidified (cast into a membrane) entirely under the surface of the quench liquid.

The Marinaccio-Knight patent also discloses that the solvent must be altered to make an aggregated polymer solution in order to make nylon membranes which are microporous throughout. Such a solution could be achieved by modifying formic acid (a good solvent) with a non-solvent (a dopant) that has a different solubility parameter, such as, water, methanol glycerin, and/or methyl formate. The modified (doped) solubility parameter of the solvent system is achieved by adding a non-solvent that has a different solubility parameter from that of the solvent.

The solubility parameter of a formic acid-methanol-water solvent system are a function of composition. The amount of the nonsolvent and the type of non-solvent must be such as to modify the solubility parameter of the formic acid to induce the proper aggregation of the nylon.

The Marinaccio-Knight patent further discloses that a non-solvent can be selected for use in the quench bath based on mutual miscibility (solubility) with the solvent and when present, the non-solvent used in the dope solution. Where the same non-solvent and solvent are used in the quench bath as in the dope solution, the ratio of solvent to non-solvent should be lower in the quench bath so that casting of the microporous microstructure occurs beneath the surface of the quench bath of catastrophic precipitation of the dope solution into a solid structure. The patent discloses a range of suitable quench bath formulations.

The Marinaccio-Knight patent discloses that the solvent system employed in the polymer solution is one of the key parameters "responsible for the development of micropores in the film." Column 2, lines 37-38. Unlike a non-solvent system which may comprise only a non-solvent, the solvent system of the Marinaccio-Knight patent includes a combination of materials. Column 2, lines 6-10. The nature of the solvent system can be empirically determined on the basis of solubility parameters. Column 2, lines 4-61. The solubility parameter of a solvent system can be changed by the addition of a third component. Column 2, line 67 - Column 3, line 4. The solubility parameter that governs aggregation of the molecules is the solubility parameter of the mixture and the patent discloses how to calculate it for a given mixture. Column 3, line 63 through Column 4, line 4. The patent further discloses that the proper aggregation of the polymer to make microporous membranes can be achieved by addition of a non-solvent or other additives. Column 4, lines 33-36. For a specific application of the general teaching, the patent then refers one skilled in the art to the procedures set forth in the Examples. Column 4, lines 41-47.

The Marinaccio-Knight patent identifies the important process parameters: polymer, solvent system, quench bath composition, polymer composition, age of polymer solution, time of quench, quench and solvent temperature and quench bath additives. Column 2, line 19-25. This patent further discloses that the "preferred" film forming polymers are nylon polymers, especially alcohol-insoluble nylon polymers. Column 5, lines 52-53. The patent specifically identifies three alcohol-insoluble nylons: nylon 6 (Allied A 8205), 610 (Zytel-31) and 66 (condensation product of hexamethylenediamine and adipic acid). Column 7, line 19, column 8, line 26, and column 9, lines 16-17.

The patent also discloses that the film structure is formed catastrophically; i.e., without the slow equilibration step of gelling in a controlled atmosphere. However, the dope solution can be exposed to an atmosphere saturated in nylon solvent system, i.e., an atmosphere rich in formic acid and water vapors, prior to being solidified in the quench bath. Column 6, lines 51-61.

Next, the Marinaccio-Knight patent discloses the application of the invention to making specific microporous alcohol-insoluble nylon, nylon 6 made by Allied Corporation and sold under the trade name A-8205. Thus, Example 1 gives a description of the procedure for making nylon microporous membrane having a pore size of 1.00 micrometer (micron). Example 1 represents the most convenient method for formulation of the dope solution. However, as one skilled in the art would immediately recognize, methanol and formic acid react. Therefore, Example 2 is provided to show the dope solution having the same ingredients as Example 1 once ultimate chemical equilibrium is achieved.

Example 3 teaches one skilled in the art that increasing the proportion of water in the quench bath from 50% to 70% reduces the pore size of the resulting membrane.

Example 4 teaches one skilled in the art that using about a 50% smaller amount of glycerol than methanol produces membrane which has about a 20% larger pore size. In other words, glycerol dopes the formic acid solubility parameter in a different way, reflecting its different solubility parameter.

Example 5 teaches one skilled in the art that a slight lowering of methanol level and concurrent increasing of the water to 70% in the quench bath changes the pore size.

Example 7 teaches that other nylon 6 and Zytel 31 - nylon 610 - produce similar results.

Example 6 is a factorial experiment which defines the outer working limits for the nylon 6, formic acid and methanol system of Example 1. The experiment varies the three principal process variables for nylon 6: (1) nylon polymer concentration, (2) non-solvent concentration in the solvent system and (3) the composition of the quench bath. Example 1, the preferred composition, is identified at the center of the cube. Given the outer limits, one skilled in the art can select the process variables to produce a desired nylon microporous membrane.

U.S. Pat. No. 4,340,479 (Pall) is directed toward hydrophilic nylon microporous membranes from nylon resins which have the ratio of methylene groups to groups of about 5:1 to 7:1, to the process for making such membranes, and to products incorporating such membranes. Briefly, the Pall patent discloses nylon membrane material which is said to be unique in that it is composed of a nylon resin which in its bulk form is hydrophobic but which is transformed into a hydrophilic membrane material. The membrane material is further asserted to be distinguishable from other nylon membrane materials in that it "reverts," when heated to a temperature just below the softening temperature of the membrane. Just below this softening temperature, the material of the Pall patent membrane is asserted to become so hydrophobic that is no longer wetted by water.

Pall asserted that the step of the process which transforms the hydrophobic resin into a hydrophilic microporous nylon membranes is the step of "nucleation of the casting solution." This "nucleation" is achieved by a controlled addition (including the rate of addition) of a nonsolvent to the nylon polymer-solvent solution so that a visible precipitate is formed. For example, the Pall patent states that:

In accordance with the invention, alcohol-insoluble polyamide resin membrane sheet is provided that is inherently hydrophilic. This is a most remarkable property, inasmuch as the alcohol-insoluble polyamide resin from which the sheet is made is hydrophobic.

In his Declaration, Dr. Pall attributed the creation of hydrophilicity in the hydrophobic starting resin to the step of "nucleation:"

The phenomenon of hydrophilicity arises primarily as the result of nucleation of the casting resin solution.

The Pall patent teaches that hydrophilic microporous (i.e., skinless) membranes can be produced by the process of that invention only from polyamide resins having $CH_2:NHCO$ (methylene to amide groups) within the range from about 5:1 to about 7:1.

In accordance with the invention, alcohol-insoluble polyamide resin membrane sheet is provided that is inherently hydrophilic. This is a most remarkable property, inasmuch as the alcohol-insoluble polyamide resin from which the sheet is made is hydrophobic. The phenomenon occurs only with alcohol-insoluble polyamide resins having a ratio $CH_2NHCO$ of methylene $CH_2$ to amide NHCO groups within the range from about 5:1 to about 7:1.

Column 8, lines 18-26. See also column 9, lines 16-25.

Pall disclosed nylons 6, 66 and 610 as being preferred, the same nylons specified in the Marinaccio-Knight patent.

The Pall patent refers to its microporous membranes as being "skinless." The patent defines "skinless" microporous membranes as those not having a $K_L$ profile of "skinned" membranes:

Skinned membranes behave very differently; when water wetted and their air flow-pressure drop relationship is determined, the curve is not flat initially, but slopes upward, indicating presence of large pores; transition to a more nearly vertical line is slow, with a large radius, and in the "vertical" area, instead of the sharp rise of FIG. 3, a sloping line is obtained, reflecting a wide pore size range. Such membranes are poorly suited to obtain sterile filtrates when challenged by bacteria; either a nonsterile fluid is obtained, or if sterility is gotten, it is at the cost of very high pressure drop to achieve a low throughput rate.

Column 26, lines 33-44.

In summary, prior to this invention the production of nylon from alcohol-soluble nylons by the "dry" (equilibrium) process was known. The Marinaccio-Knight process disclosed a process for production of nylon membranes from both alcohol soluble and alcohol-insoluble nylons by a rapid immersion process in which the structure of the membrane was formed under the surface of the quench bath. The Pall patent taught that hydrophilic skinless nylon membranes were made only from hydrophobic polyamide resins which have the ratio of methylene to amide groups within the range from about 5:1 to about 7:1.

U.S. Pat. No. 4,788,226 (Curry) discloses skinless polyamide hydrophilic membranes suitable for use in microfiltration. These membranes are made of polytetramethylene adipamide (Nylon 46), either alone, or in admixture with at least one other polyamide. The Curry patent discloses that the additional polyamides can include polyhexamethylene adipamide (Nylon 6, 6), poly-e-caprolactam (Nylon 6) and polyhexamethylene sebacamide (Nylon 610). It also discloses that the Nylon 46 membranes could be cast using either a wet process or a dry process. Column 2, lines 27-29.

The present invention goes against the teachings of the prior art and specifically of the Pall patent and provides a hydrophilic "skinless" (under the $K_L$ test definition "$K_L$ test skinless") microporous membrane from a nylon resin which is outside the range of ratios of methylene to amide groups specified in the Pall patent. Moreover, contrary to the assertions made in the Pall patent, membranes are made without the need for forming a visible precipitate in making a dope solution. Finally, contrary to the teachings of the Pall patent, membranes which are "skinless" under Pall's definition of this term are produced in a quench bath which includes only small amounts of formic acid.

The present invention provides membranes of polytetramethylene adipamide which have narrow pore-size distributions and a process for making such membranes. The present invention also provides membranes which have pore-size distribution so narrow that they are useful as transfer media in transfer of macromolecules from a chromatographic substrate to an immobilizing matrix.

BRIEF DESCRIPTION OF THE INVENTION

In accordance with one aspect of the present invention, a microporous hydrophilic membrane having narrow pore-size distribution is comprised of polytetramethylene adipamide or nylon 46. The membrane is particularly useful for efficient filtration of parenteral liquids, filtration of ultra-pure water used in the electronic industry and as a transfer medium for chromatography and electrophoresis.

In accordance with another aspect of the present invention, a hydrophilic microporous nylon membrane which is skinless within the definition of the Pall patent is made out of nylon 46 resin.

In accordance with another aspect of the invention an efficient, simple and economic process for making hydrophilic polytetramethylene adipamide or Nylon 46 microporous membrane includes the steps of: (1) making a dope solution from polytetramethylene adipamide resin (Nylon 46), solvent for Nylon 46 and a dopant; and (2) directly casting the dope solution under the surface of the quench liquid for a time sufficient to rapidly form micropores in the resulting cast. The rapid quenching is effected by the use of a quench liquid which has the solubility parameter greater than 21 Hildebrands.

In accordance with another aspect of the invention, the dope solution is made so as to avoid precipitation of polytetramethylene adipamide (Nylon 46). The avoidance of the precipitation can be accomplished by doping the solvent prior to the addition of nylon.

In accordance with a further aspect of the process of the present invention, Nylon 46 is first dissolved in a solvent and a dopant is added to the solution to form the dope solution. The dopant is added so as to form localized precipitation only. This approach avoids the need to filter or redesolve the precipitated nylon.

In accordance with still another aspect of the present invention, the process of the present invention does not require on-line adjustment of the process. This reduces the operational cost of the process.

In accordance with a still another aspect of the present invention, the membrane of the present invention made of polytetramethylene adipamide (Nylon 46) is hydrophilic and has low shrinkage.

Other aspects of the present invention will become apparent to those skilled in the art upon studying this disclosure and the appended claims.

DETAILED DESCRIPTION OF THE INVENTION

Figure 1:
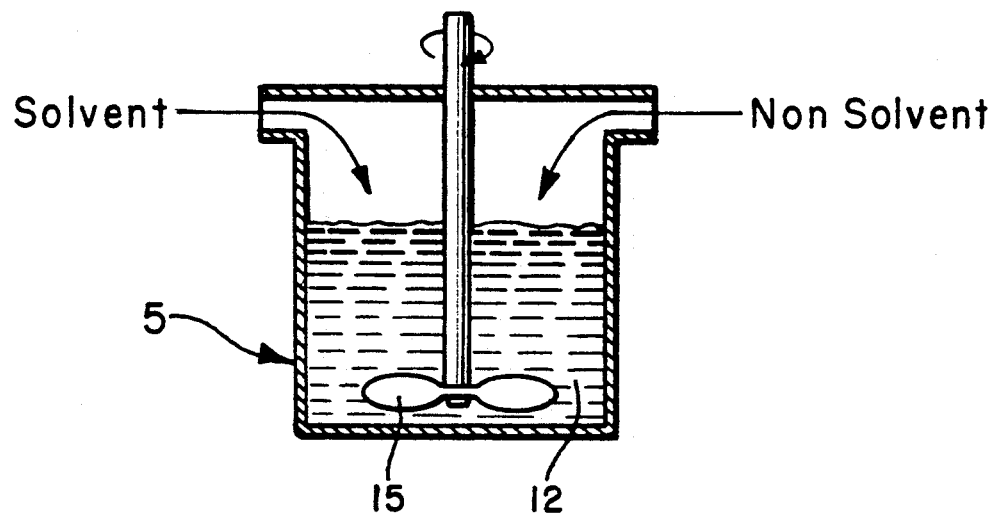
FIG. 1 is a schematic depicting mixing of solvent and non-solvent in accordance with the preferred embodiment of the present invention.

It has been discovered that hydrophilic microporous membrane having a narrow pore size distribution can be made from polytetramethylene adipamide (Nylon 46) polymer. It has further been discovered that such membrane can be formed under the surface of the quench liquid rapidly without forming a skin layer even when the quench bath composition has a solubility parameter of more than 21 Hildebrands.

The nylon suitable for use in the present invention is polytetramethylene adipamide resin which has the following general formula:

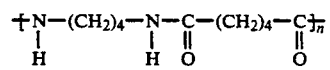

The preferred polytetramethylene adipamide resin is Nylon 46 resin made by DSM Company with its offices at Heerlen, Holland. This resin is distributed in the United States under the trademark Stanyl by DSM Chemical Sales USA, Inc., Waterstone Suite 140, 4751 Best Road, Atlanta, Georgia 30337. Presently most preferred is the resin sold under the designation Stanyl KS400. The resins designated Stanyl KS500, Stanyl KS300 and Stanyl KS200 are the other preferred resins. The process for making polytetramethylene adipamide is well known in the art. For example, various methods of making this polymer are described in the following patents: U.S. Pat. No. 4,722,997 (Roerdink et al.), U.S. Pat. No. 4,719,284 (Nielinger et al.), U.S. Pat. No. 4,716,214 (Gaymans).

Any solvent which alone or in combination with the non-solvent dissolves nylon 46 can be used in connection with the present invention. However, such solvent, when doped, must have solubility parameter which allows the formation of a microporous membrane by rapid quench. The solvents which can be used in connection with the present invention include: formic acid, mixture of formic acid and inorganic acids (such as HCL) and o-cresol. The currently preferred solvent is formic acid. In the experiments, formic acid manufactured by Fluka Company of Switzerland and purchased under the designation anhydrous formic acid PURISS. P.A. is presently preferred. However, other types and grades of formic acid can also be used. The selection of a solvent or the selection of a particular formic acid and its concentration for making the membrane of this invention is within the ordinary skill of the art.

Any dopant which can alter the solubility parameter of the solvent in accordance with the teachings of the Marinaccio-Knight patent can be used in connection with the present invention. However, the best results are presently achieved by using non-solvents which are miscible with the solvent. Presently, preferred non-solvents in the order of preference are: methanol, water and glycerin. Other dopants include inorganic salts, such as, KCl and organic polymers. The use of change-modifying polymers is especially preferred. The advantage of using charge-modifying polymers is that a positive or a negative charge can be imparted to the membrane. Such polymers include those disclosed in U.S. Pat. Nos. 4,473,474 (Ostreicher et al), 4,473,475 (Barnes et al.), 4,604,208 (Chu et al.), 4,702,840 (Degen et al.) and 4,707,266 (Degen et al). The preferred polymer is polyepichlorohydrin, and in particular, R4308 resin manufactured by Hercules Corporation.

The schematic of a preferred embodiment of the process for making the membrane of the present invention is depicted in FIGS. 1 through 4. Referring now to FIG. 1, non-solvent and solvent are first mixed in a vessel 5 together to form a uniform solution 12. The non-solvent should be miscible with the solvent. The mixing of two miscible liquids is within the ordinary skill of the art and can be accomplished using conventional equipment. To save time and to assure uniform mixing agitation by using a conventional agitator as shown in FIG. 1 is preferred. If the solvent and the non-solvent react with each other, the mixing is preferably long enough to permit the reaction to reach equilibrium. For example, if methanol and formic acid are used, the mixing time should be in access of 20 minutes, the time required to reach the equilibrium.

Figure 2:
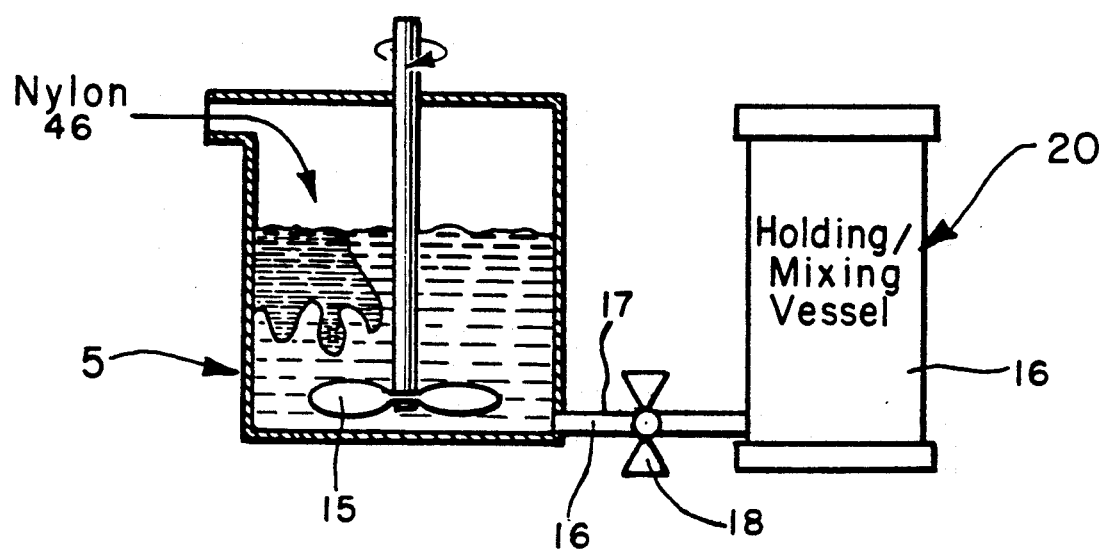
FIG. 2 is a schematic depicting forming a dope solution in accordance with the preferred embodiment of the present invention.

Next, as shown in FIG. 2, Nylon 46 resin is added to the vessel 5. The nylon is dissolved in the solvent-non-solvent solution 12. The dissolution can be accomplished using conventional equipment known to those skilled in the art. For example, the dissolution can be effected by "rolling" the vessel containing the solution and the Nylon 46 resin or by using a conventional agitator 15. Generally, the dissolution of nylon takes between about 16 and 24 hours.

The resulting dope solution 16 is transferred from the vessel 5 via pipe 17 past the valve 18 into a holding/mixing vessel 20. The holding mixing vessel 20 can include an agitator (not shown) for additional mixing. The vessel 20 can be on rollers (not shown) so that it can be easily stored and transported to the casting area. Aging of the dope solution is sometimes helpful to achieve batch-to-batch uniformity.

Preferably, the vessel 5 has a water jacket (not shown) to permit control of the temperature of the dope solution 16. Maintaining, the same temperature from one batch to the next helps to produce membrane of the same pore size if other parameters affecting pore size are maintained constant as well.

Figure 3:
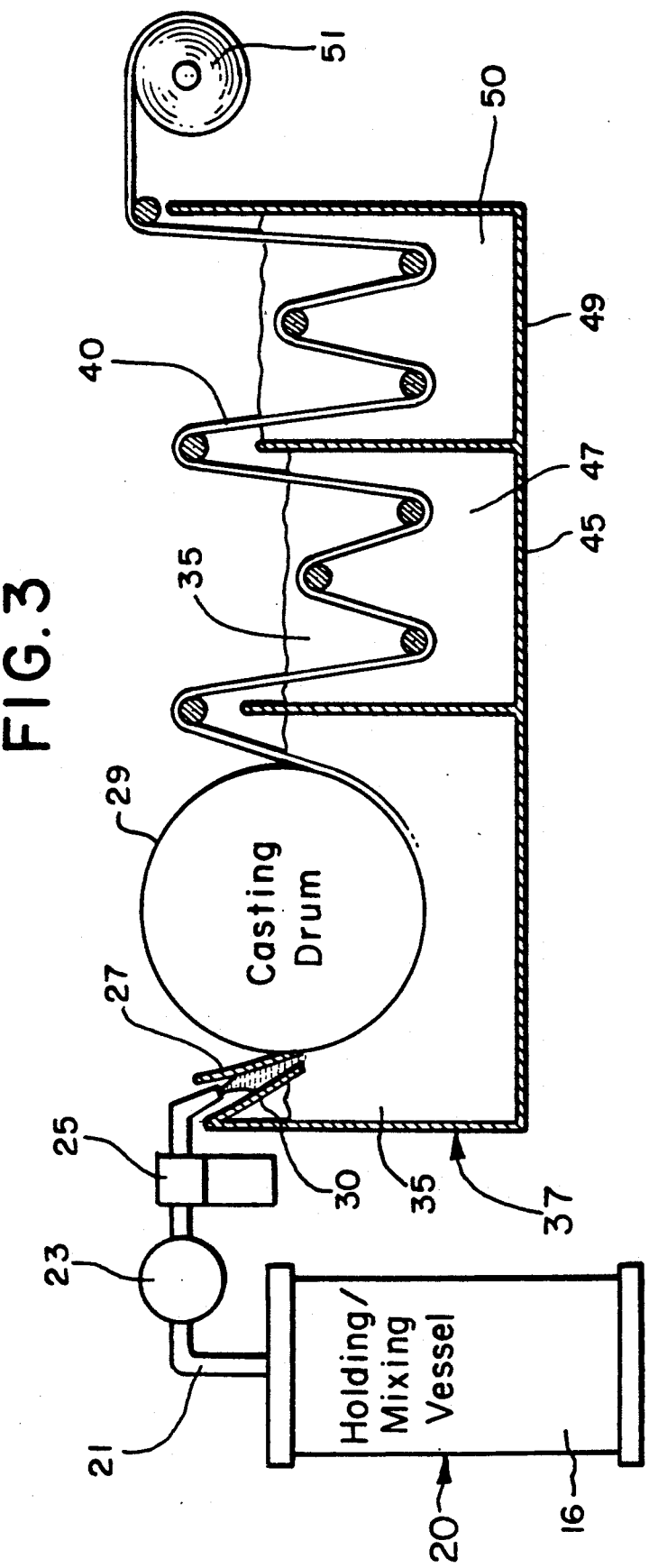
FIG. 3 is a schematic depicting membrane casting conducted in accordance with the preferred embodiment of the present invention.

As shown in FIG. 3, the dope solution 16 is transported to the casting area in the holding/mixing vessel 20. The dope solution 16 is pumped using a pump 23 via conduit 21 through a filter 25 into a casting head 27. The filter 25 removes debris and undissolved nylon. Generally, conventional 10 micron filter is used for this purpose. From the casting head 27, the dope solution 16 is applied onto a casting drum 29 using a conventional casting knife 30. The dope solution 16 is applied so as to avoid any substantial contact with the atmosphere. This can be accomplished by applying the solution onto the drum near or below the surface of the quench bath. As shown in FIG. 2, in the alternative, the substantial contact with the atmosphere can be avoided by maintaining the volume between the casting knife and the quench bath surface sufficiently saturated in the solvent and non-solvent to avoid significant evaporation. As should be recognized by one skilled in the art, a substantial contact with the atmosphere is a contact that would produce a skin layer on the membrane.

Upon contact with the quenching medium 35 in the quenching bath container 37, the dope solution solidifies forming a microporous membrane 40. The quenching medium 35 is preferably water or water with other solvents and/or non-solvents. However, for extremely rapid formation of the membrane, the quench liquid should have a solubility parameter of about 21 Hildebrands or higher.

The microporous membrane 40 is transported to a wash tank 45 where it is contacted with water 47 in order to wash away traces of the solvents and non-solvents. From the wash tank 45 the membrane 40 is transported to a final wash tank 49 where it is contacted with pure 1 megohm water 50. The wet membrane is then rolled on a roller 51.

Figure 4:
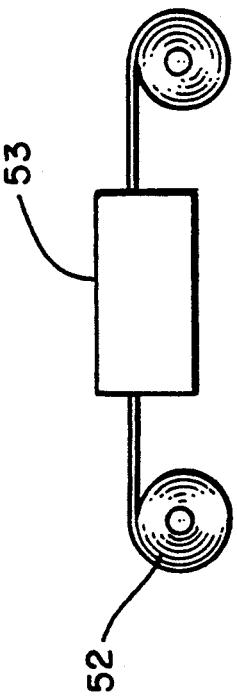
FIG. 4 is a schematic depicting drying of membrane conducted in accordance with the preferred embodiment of the present invention.

The rolls of wet membrane 52 are then dried on conventional drying equipment 53, as shown in FIG. 4. Preferably, the drying is effected under sufficient restraint to prevent the membrane from shrinking and to achieve good flow rates for a given pore size. The conditions and the equipment needed for restrained drying of nylon membrane are well known in the art.

The following Examples are provided to further illustrate the invention. These examples are not intended to limit the scope of the present invention.

EXAMPLES 1-3

A doped Nylon 46 solution was prepared from the following ingredients:

| | |
|---|---|
| KS-400 Nylon | 24.0 grams |
| Formic Acid | 118.1 grams |
| Methanol | 7.9 grams |

The methanol and formic acid were dissolved together and the esterification reaction was allowed to proceed, with gentle mixing, for 1 hour. Then, 24 grams KS-400 Nylon 46 polymer in form of pellets was added to the solution. The nylon and the solvent-non-solvent solution were mixed at a high rate using a laboratory wrist shaker for 16 hours to obtain a dope solution. The viscosity of the doped polymer solution was measured to be 2,791 CPS using a Brookfield viscometer. This dope solution was formed into membrane under the surface of a quench bath using a "zero-quench" casting apparatus. This casting apparatus allows spreading of the dope solution substantially without atmospheric contact. The dope solution is poured behind a spreader. The spreader is then brought to the surface of the quench bath. The glass is then pushed into the quench bath so that the dope solution is spread and immediately immersed in the quench bath.

Three experiments were conducted using the dope solution made as described above. In the three experiments (Examples 1, 2 and 3), the quench bath had methanol to water concentrations by volume of 20, 30 and 0

(i.e., no methanol-only water) percent. The properties of the hydrophilic microporous Nylon 46 membranes produced in the three Examples are shown in Table I.

TABLE I

| Ex. No | Quench Bath (MeOH/H2O) | ThK (mils) | IBP (psi) | FAOP (psi) | IBP/FAOP Ratio | Flow (ml/min/cm²) | Time Sec | Tensile (psi) Wet | Dry |
|---|---|---|---|---|---|---|---|---|---|
| 1 | 20 | 5.5 | 17.0 | 18.5 | .92 | 32 | 30 | 93 | 215 |
| 2 | 30 | 5.5 | 15.5 | 18.0 | .86 | 32 | 40 | 109 | 281 |
| 3 | 0 | 5.5 | 16.5 | 18.5 | .86 | 31 | 10 | 59 | 182 |

EXAMPLE 4 THROUGH 7

Nylon 46 doped polymer solution was prepared from the following ingredients:

| Nylon KS-400 | 27.0 grams |
|---|---|
| Formic Acid | 113.1 grams |
| Glycerine | 7.9 grams |

The formic acid and non-solvent (glycerine) were dissolved together and gently mixed for 1 hour. Nylon 46 polymer was then added to the solution and mixed at a high rate on a laboratory wrist shaker for 16 hours to effect dissolution of nylon.

The resulting dope solution was then formed into membrane using the zero-quench apparatus (not shown). The compositions of the quench bath in Examples 3-7 were as shown in Table II. "Gly," "MeOH" and "FA" are abbreviations for glycerine, methanol and formic acid, respectively. The resulting membrane was washed in water, dried and tested. The results of the tests are shown in Table II.

TABLE II

| Ex. | Non-Solvent | Quench Bath Composition | Water Flow (ml/min/cm²) | Thick (mils) | Quench Time (Sec) | Tensile (Psi) Wet | Dry | BP | FAP | BP/FAOP Ratio |
|---|---|---|---|---|---|---|---|---|---|---|
| 4 | Gly | H2O | 15 | 5.8 | 5 | 103 | 378 | 25.0 | 28.3 | 0.88 |
| 5 | Gly | 30% MeoH* | 15 | 5.7 | 35 | 169 | 683 | 25.5 | 28.7 | 0.89 |
| 6 | Gly | 30% Gly* | 14 | 6.0 | 35 | 140 | 495 | 27.0 | 31.5 | 0.86 |
| 7 | Gly | 30% FA* | 20 | 6.3 | 100 | 66 | 322 | 23.0 | 25.5 | 0.90 |

*Quench Bath Composition is reported as volume percent in water (volume by volume).

EXAMPLES 8 THROUGH 11

Nylon 46 doped polymer solution was prepared from the following ingredients:

| Nylon KS-400 | 27.0 grams |
|---|---|
| Formic Acid | 114.1 grams |
| Methanol | 8.9 grams |

The formic acid and non-solvent methanol were dissolved together and gently mixed for 1 hour. KS-400 Nylon 46 polymer was then added to the solution and the resulting mixture was mixed at a high rate on a laboratory wrist shaker for 16 hours to insure dissolution. This dope solution was then used for Examples 8-11.

The quench bath used in Example 8 was water. The compositions of quench baths of Examples 9 through 11 were: 30% methanol/water, 30% glycerine/water and 30% formic acid/water (volume/volume percent) (as is shown in Table III).

TABLE III

| Ex. | Non-Solvent | Quench Bath Composition | Water Flow (ml/min/cm²) | Tk (mils) | Quench Time (Sec) | Tensile (Psi) Wet | Dry | BP | FAP | BP/FAOP Ratio |
|---|---|---|---|---|---|---|---|---|---|---|
| 8 | MeOH | H2O | 6 | 5.7 | 5 | 176 | 662 | 40.0 | 51.0 | 0.78 |
| 9 | MeOH | MeOH | 5 | 5.1 | 35 | 295 | 1072 | 46.5 | 53.5 | 0.87 |
| 10 | MeOH | Gly | 5 | 5.3 | 33 | 225 | 827 | 35.5 | 54.5 | 0.65 |
| 11 | MeOH | FA | 9 | 5.7 | 88 | 100 | 474 | 33.5 | 43.5 | 0.77 |

Many changes and modifications of the invention described in the specification will occur to those skilled in the art. All such changes and modifications in the spirit of the present invention are intended to be included within its scope as defined by the claims.

I claim:

1. A hydrophilic microporous membrane of polytetramethylene adipamide, useful for filtration of parenteral liquids and ultra-pure water, said membrane providing a solution to the problem of poor polytetramethylene adipamide membrane performances, said membrane having the pore-size distribution defined by the ratio of the initial bubble point to the foam-all-over point of at least about 0.75.

2. The membrane of claim 1 wherein the ratio of the initial bubble point to the foam-all-over point is more than about 0.85.

3. The membrane of claim 1 wherein the ratio of the initial bubble point to the foam-all-over point is more than about 0.9.

4. A hydrophilic membrane of polytetramethylene adipamide, said membrane providing solution to the problem of poor membrane performance, having a pore size distribution, as defined by a ratio of the initial bubble point to the foam all over point, sufficiently narrow to provide efficient filtration in the desired range of at least about 0.75.

5. An immobilizing matrix, said membrane providing solution to the problem of poor membrane performance, said membrane comprising a hydrophilic membrane of polytetramethylene adipamide having a pore-size distribution sufficiently narrow to permit the use of said membrane for immobilizing macromolecules transferred from a chromatographic substrate of at least about 0.75.

6. The membrane claim 5 wherein the pore-size distribution, as defined by the ratios of the initial-bubble-point to the foam-all-over point, is above about 0.8.

7. The membrane of claim 5 wherein the pore-size distribution, as defined by the ratio of the initial-bubble-point to the foam all over point, is above about 0.9.

* * * * *

UNITED STATES PATENT AND TRADEMARK OFFICE
CERTIFICATE OF CORRECTION

PATENT NO. : 5,084,179
DATED : January 28, 1992
INVENTOR(S) : Rodney A. Knight

It is certified that error appears in the above-indentified patent and that said Letters Patent is hereby corrected as shown below:

<u>IN THE ABSTRACT</u>

On the title page, line 4 of the Abstract, before "21" delete "and".

In column 1, line 54, delete "poor" and substitute therefor --for--.

In column 2, line 50, delete "Teijun" and substitute therefor --Teijin--.

In column 2, line 64, delete "leathersubstitute" and substitute therefor --leather-substitute--.

In column 7, line 67, before "still" delete "a".

In column 8, line 55, delete "nylon" and substitute therefor --Nylon--.

In column 9, line 35, delete "access" and substitute therefor --excess--.

UNITED STATES PATENT AND TRADEMARK OFFICE
CERTIFICATE OF CORRECTION

PATENT NO. : 5,084,179
DATED : January 28, 1992
INVENTOR(S) : Rodney A. Knight

It is certified that error appears in the above-indentified patent and that said Letters Patent is hereby corrected as shown below:

IN THE CLAIMS

In claim 1, line 5, delete "performances" and substitute therefor --performance--.

In claim 6, line 1, before "claim" insert --of--.

Signed and Sealed this

Fifth Day of July, 1994

Attest:

BRUCE LEHMAN

Attesting Officer

Commissioner of Patents and Trademarks